US012615581B2

(12) United States Patent
Dumdei et al.

(10) Patent No.: US 12,615,581 B2
(45) Date of Patent: Apr. 28, 2026

(54) QUALITY-OF-SERVICE MECHANISMS WITH OVERLAPPING BASIC SERVICE SET

(71) Applicant: Cisco Technology Inc., San Jose, CA (US)

(72) Inventors: Al W. Dumdei, Greenville, TX (US); Malcolm Smith, Richardson, TX (US); Brian Donald Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 390 days.

(21) Appl. No.: 18/359,711

(22) Filed: Jul. 26, 2023

(65) Prior Publication Data

US 2025/0039774 A1     Jan. 30, 2025

(51) Int. Cl.
| | |
|---|---|
| *H04W 48/16* | (2009.01) |
| *H04W 28/02* | (2009.01) |
| *H04W 28/24* | (2009.01) |
| *H04W 72/566* | (2023.01) |

(52) U.S. Cl.
CPC ....... *H04W 48/16* (2013.01); *H04W 28/0268* (2013.01); *H04W 28/24* (2013.01); *H04W 72/569* (2023.01)

(58) Field of Classification Search
CPC ... H04L 47/24; H04L 47/245; H04L 47/6275; H04L 47/6215; H04W 48/16; H04W 28/0268; H04W 28/24; H04W 72/569; H04W 84/12
See application file for complete search history.

(56) References Cited

U.S. PATENT DOCUMENTS

| | | |
|---|---|---|
| 10,470,138 B2 | 11/2019 | Kwon |
| 2008/0137627 A1 | 6/2008 | Fischer |
| 2016/0227531 A1 | 8/2016 | Thoukydides |
| 2017/0019923 A1 | 1/2017 | Agardh |

(Continued)

FOREIGN PATENT DOCUMENTS

WO      WO-2021004079 A1 *  1/2021  ............ H04W 84/12

OTHER PUBLICATIONS

International Search Report and Written Opinion for International Application No. PCT/US2024/037699, mailed Oct. 10, 2024, 14 Pages.

(Continued)

*Primary Examiner* — Khoa Huynh
(74) *Attorney, Agent, or Firm* — Baker Botts L.L.P.

(57) ABSTRACT

The present disclosure is directed to detecting, by a first wireless endpoint device associated with a first basic service set (BSS) neighboring a neighboring overlapping BSS (OBSS), a received data packet from a second wireless endpoint device associated with the OBSS, upon determining the received data packet satisfies a first OBSS threshold and a high-priority data packet is in queue for transmission by the first wireless endpoint device, determining whether the received data packet satisfies a second OBSS threshold, maintaining the high-priority data packet in queue if the received data packet satisfies a second OBSS threshold, and transmitting the high-priority data packet by the first wireless endpoint device if the received data packet does not satisfy the second OBSS threshold.

19 Claims, 4 Drawing Sheets

(56)  References Cited

U.S. PATENT DOCUMENTS

2022/0132331 A1    4/2022  Dakshinkar

OTHER PUBLICATIONS

More WiFi for Everyone: Increasing Spectral Efficiency in WiFi6 Networks using OBSS/PD Mechanism; Ali Karakoc, et al.; https://arxiv.org/pdf/2108.13909.pdf, Aug. 31, 2021.
Control OBSS/PD Sensitivity Threshold for IEEE 802.11ax BSS Color, Ioannis Selinis, et al.; https://dl.acm.org/doi/abs/10.1109/PIMRC.2018.8580778, Sep. 9, 2018.
On Quality-of-Service Provisioning in IEEE 802.11ax WLANs; Der-Jiunn Deng, et al.; https://ieeexplore.ieee.org/document/7551170, Aug. 24, 2016.
Deng D-J., et al., "On Quality-of-Service Provisioning in IEEE 802.11ax WLANs," IEEE Access, Special Section On Green Communications And Networking For 5G Wireless, Oct. 15, 2016, vol. 4, 19 Pages, 10.1109/ACCESS.2016.260228.
Karakoc A., et al., "More Wifi for Everyone: Increasing Spectral Efficiency in Wifi6 Networks Using OBSS/PD Mechanism," arXiv:2108.13909v1 [cs.NI], Aug. 31, 2021, pp. 1-9.
Selinis I., et al., "Control OBSS/PD Sensitivity Threshold For IEEE 802.11ax BSS Color," 2018 IEEE 29th Annual International Symposium on Personal, Indoor, and Mobile Radio Communications (PIMRC), Sep. 2018, 7 Pages.

* cited by examiner

100

QUALITY-OF-SERVICE MECHANISMS WITH OVERLAPPING BASIC SERVICE SET

TECHNICAL FIELD

The present disclosure generally relates to Wi-Fi technologies, and more specifically to systems and methods for prioritizing transmissions of high-priority data packets.

BACKGROUND

Wi-Fi is a family of wireless network protocols based on the IEEE 802.11 family of standards, which are commonly used for local area networking of devices and Internet access, allowing nearby digital devices to exchange data by radio waves. These are the most widely used computer networks in the world, used globally in home and small office networks to link devices together and to a wireless router to connect them to the Internet, and in wireless access points in public places like coffee shops, hotels, libraries, and airports to provide visitors with Internet connectivity for their mobile devices.

In IEEE 802.11 wireless local area networking standards (including Wi-Fi), a service set is a group of wireless network devices which share a service set identifier (SSID)—typically the natural language label that users see as a network name. A service set forms a logical network of nodes operating with shared link-layer networking parameters; they form one logical network segment. A service set is either a basic service set (BSS) or an extended service set (ESS). On top of the basic service set, an overlapping basic service set (OBSS) can be formed, which includes two or more basic service sets that overlap because their channel configurations occupy some of the same space.

DESCRIPTION OF EXAMPLE EMBODIMENTS

Overview

Figure 1:
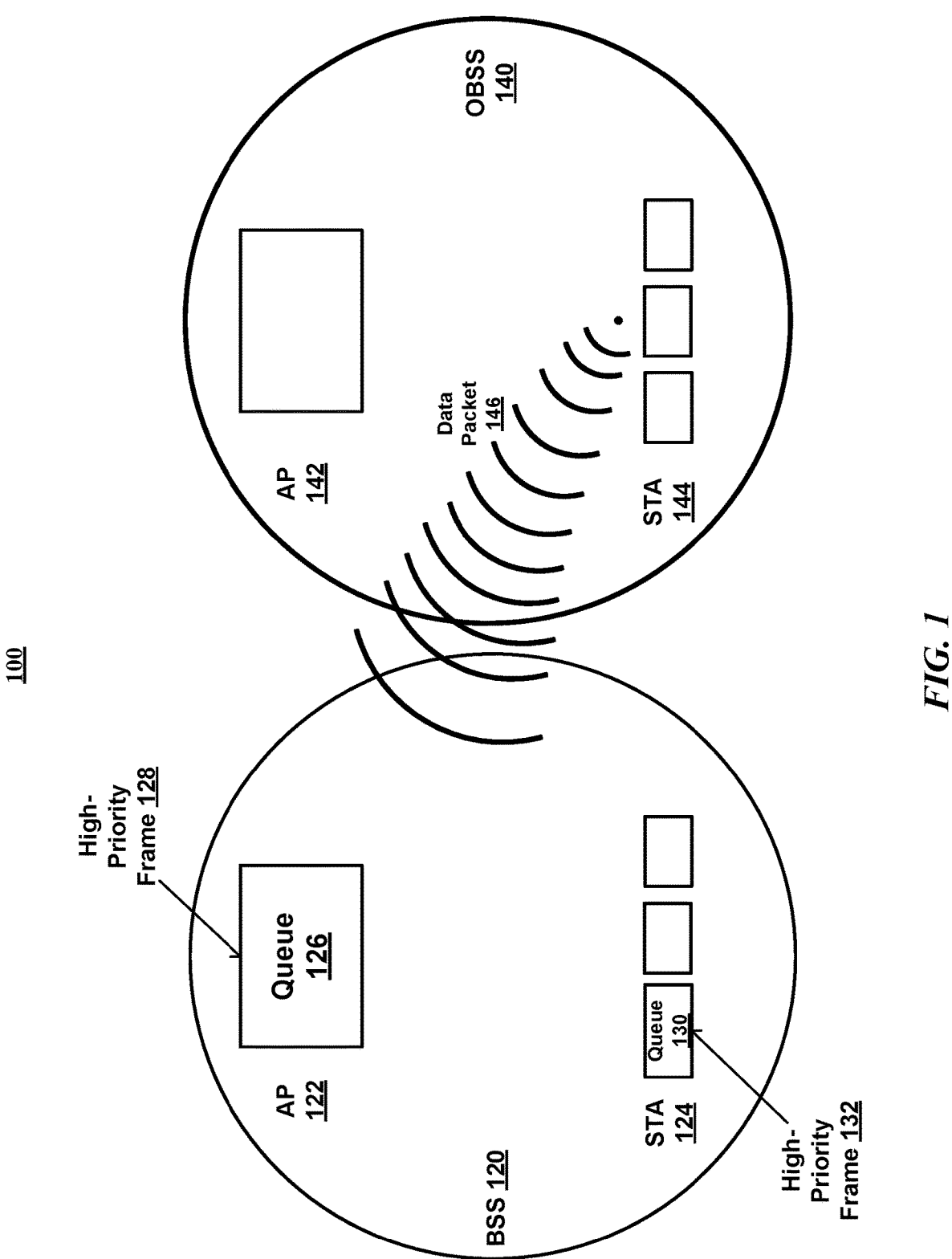
FIG. 1 illustrates an example system for prioritizing transmissions of high-priority packets, in accordance with certain embodiments.

According to an embodiment, a system may include one or more processors and one or more computer-readable non-transitory storage media comprising instructions that, when executed by the one or more processors, cause one or more components of the system to perform operations including detecting, by a first wireless endpoint device associated with a first basic service set (BSS) neighboring a neighboring overlapping BSS (OBSS), a received data packet transmitted from a second wireless endpoint device, and the second wireless endpoint device is associated with the neighboring OBSS; determining, by the first wireless endpoint device, whether the received data packet satisfies a first OBSS threshold; upon determining the received data packet satisfies the first OBSS threshold, determining, by the first wireless endpoint device, whether a high-priority data packet is in queue for transmission by the first wireless endpoint device; upon determining a high-priority data packet is in queue for transmission, determining, by the first wireless endpoint device, whether the received data packet satisfies a second OBSS threshold; and based on determining whether the received data packet satisfies the second OBSS threshold: if the received data packet satisfies the second OBSS threshold, maintaining, by the first wireless endpoint device, the high-priority data packet in queue for transmission; and if the received data packet does not satisfy the second OBSS threshold, transmitting, by the first wireless endpoint device, the high-priority data packet.

Additionally, the operations may include upon determining the received data packet does not satisfy the first OBSS threshold, transmitting, by the first wireless endpoint device, one or more data packets in queue for transmission.

Additionally, the operations may include upon determining a high-priority data packet is not in queue for transmission, triggering, by the first wireless endpoint device, a back-off timer, and maintaining, by the first wireless endpoint device, one or more data packets in queue for transmission.

Moreover, a priority associated with the high-priority data packet may indicate a quality-of-service (QoS) level.

Moreover, the second OBSS threshold may be determined based on the QoS level.

Additionally, the operations may include determining, based on a quality-of-service (QoS) level associated with the high-priority data packet by the first wireless endpoint device, the second OBSS threshold from among a plurality of OBSS thresholds.

Additionally, the operations may include determining, based on a category of marking associated with the high-priority data packet by the first wireless endpoint device, a priority associated with the high-priority data packet.

Additionally, the operations may include determining, based on a category of marking associated with the high-priority data packet by the first wireless endpoint device, the second OBSS threshold.

Additionally, the operations may include determining, by the first wireless endpoint device, a waiting time of the high-priority data packet being in queue for transmission; updating, based on the waiting time by the first wireless endpoint device, the second OBSS threshold; determining, by the first wireless endpoint device, the received data packet does not satisfy the updated second OBSS threshold; and transmitting, by the first wireless endpoint device, the high-priority data packet.

According to another embodiment, a method may include the steps of detecting, by a first wireless endpoint device associated with a first basic service set (BSS) neighboring a neighboring overlapping BSS (OBSS), a received data packet transmitted from a second wireless endpoint device, and the second wireless endpoint device is associated with the neighboring OBSS; determining, by the first wireless endpoint device, whether the received data packet satisfies a first OBSS threshold; upon determining the received data packet satisfies the first OBSS threshold, determining, by the first wireless endpoint device, whether a high-priority data packet is in queue for transmission by the first wireless endpoint device; upon determining a high-priority data packet is in queue for transmission, determining, by the first wireless endpoint device, whether the received data packet satisfies a second OBSS threshold; and based on determining whether the received data packet satisfies the second OBSS threshold: if the received data packet satisfies the second OBSS threshold, maintaining, by the first wireless endpoint device, the high-priority data packet in queue for transmission; and if the received data packet does not satisfy the second OBSS threshold, transmitting, by the first wireless endpoint device, the high-priority data packet.

According to yet another embodiment, one or more computer-readable non-transitory storage media may embody instructions that, when executed by a processor, cause the performance of operations, including detecting, by a first wireless endpoint device associated with a first basic service set (BSS) neighboring a neighboring overlapping BSS (OBSS), a received data packet transmitted from a second wireless endpoint device, and the second wireless endpoint device is associated with the neighboring OBSS; determining, by the first wireless endpoint device, whether the received data packet satisfies a first OBSS threshold; upon determining the received data packet satisfies the first OBSS threshold, determining, by the first wireless endpoint device, whether a high-priority data packet is in queue for transmission by the first wireless endpoint device; upon determining a high-priority data packet is in queue for transmission, determining, by the first wireless endpoint device, whether the received data packet satisfies a second OBSS threshold; and based on determining whether the received data packet satisfies the second OBSS threshold: if the received data packet satisfies the second OBSS threshold, maintaining, by the first wireless endpoint device, the high-priority data packet in queue for transmission; and if the received data packet does not satisfy the second OBSS threshold, transmitting, by the first wireless endpoint device, the high-priority data packet.

Technical advantages of certain embodiments of this disclosure may include one or more of the following. The systems and methods described herein may use OBSS to enhance quality-of-service (QoS) in a highly congested Wi-Fi network by getting high-priority packets transmitted according to the scheduled time. The systems and methods described herein may additionally minimize overall interference by only introducing higher levels of interference in cases where it is truly necessary, thereby allowing the transmission of best-effort (BE) data to be minimally impacted.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Being able to transmit data packets in a highly congested Wi-Fi network can be difficult. High-priority packets such as voice packets may need to be given priority. Today the only mechanism may be the adjustment of EDCA (enhanced distributed channel access) parameters to try to "improve" the probability of transmitting a packet. However, such a mechanism may create a situation where the Wi-Fi network is still considered not to be a deterministic network even with the advent of OFDMA (orthogonal frequency-division multiple access) and other spectral reuse features, such as overlapping basic service sets (OBSS). It may be important not to create unnecessary interference in a Wi-Fi network but still give the data packets with the highest priority a chance to be transmitted according to the scheduled time.

In the embodiments disclosed herein, a wireless endpoint device may use OBSS to improve existing quality-of-service (QoS) mechanisms in a Wi-Fi network. In a conventional OBSS, there may be only one threshold set for the OBSS. If this threshold is set high, the primary endpoint device (e.g., an access point or a station) may talk over communication in the secondary endpoint device (e.g., an access point or a station), thus creating more interference in the secondary endpoint. If the threshold is set lower, the primary endpoint device may not be able to transmit data packets in the case of congestion in the secondary endpoint device. By setting QoS based OBSS threshold or dynamically changing the OBSS threshold, the data packets with higher priority can get the benefit of being able to transmit over the congestion but the data packets with lower priority may not. As a result, the system may create additional contention in the secondary endpoint device. If all endpoint devices abide by this, they may provide a more deterministic network by creating contention based on the QOS markings set in the packet buffer and getting high-priority packets transmitted but yet not creating unnecessary interference with other endpoint devices. In particular embodiments, the number of thresholds may vary based on implementation, but this disclosure contemplates any use of suitable QBSS thresholds to improve QoS.

FIG. 1 illustrates an example system 100 for prioritizing transmissions of high-priority packets, in accordance with certain embodiments. System 100 may include a BSS 120 neighboring an OBSS 140 based on a Wi-Fi network. The Wi-Fi network may be based on an Institute of Electrical and Electronic Engineers (IEEE) 802.11 specification.

In particular embodiments, BSS 120 may comprise a Wi-Fi access point (AP) 122 in communication with a station (STA) 124. OBSS 140 may comprise a Wi-Fi access point (AP) 142 in communication with a station (STA) 144. In particular embodiments, AP 122 or AP 142 may be a device that creates a wireless local area network. AP 122 or AP 142 may connect to a wired router, switch, or hub via an Ethernet cable, and transmit a Wi-Fi signal to a designated area to connect other wireless devices, e.g., STA 124 or STA 144, respectively. In other words, an access point may relay data between the wireless devices and wired devices of the network. In particular embodiments, STA 124 or STA 144 may be a device that has Wi-Fi capability and allows transmission and reception of data via the wireless local area network.

Examples of an access point (e.g., AP 122 or AP 142) may include a femtocell, a hotspot, a picocell, a small cell, a Wi-Fi array, or any other suitable access device, which may be capable of providing suitable connectivity to a wireless device. In particular embodiments, AP 122 or AP 142 may be capable of supporting at least 802.11ax (WiFi6) or higher and may become part of the WiFi8 standard for implementation. Examples of a station (e.g., STA 124 or STA 144), which may also be referred to as "user equipment," "endpoint," or "wireless device," may include a computer, a personal digital assistant (PDA), a laptop, an electronic notebook, a smartphone, an Internet-of-Things (IoT) device, or any other device, component, element, or object capable of sending or receiving data (e.g., voice, audio, video, media) within system 100.

In particular embodiments, an access point (e.g., AP 122 or AP 142) may provide a communication interface between a station (e.g., STA 124 or STA 144, respectively) and the network. More generally, any station may be capable of communicating with any access point, provided that the station is within the coverage area and authorized to communicate with a given access point. In particular embodiments, STA 124 may be connected to AP 122 (i.e., may have an established communication link with AP 122) at all times. STA 144 may be connected to AP 142 (i.e., may have an established communication link with AP 142) at all times. Communication between an access point and a station may include downlink and/or uplink communications via a wireless communication channel. For downlink communications, AP 122 may act as a transmitter and STA 124 may act as a receiver whereas AP 142 may act as a transmitter and STA 144 may act as a receiver. For uplink communications, AP 122 may act as a receiver and STA 124 may act as a transmitter whereas AP 142 may act as a receiver and STA 144 may act as a transmitter.

In particular embodiments, AP 122 may have a queue 126 in which a high-priority frame 128 is waiting to be transmitted by AP 122 over BSS 120. Similarly, STA 124 may have a queue 130 in which a high-priority frame 132 is waiting to be transmitted by STA 124 over BSS 120. In certain cases, there may be data packets coming from OBSS 140. As an example and not by way of limitation, FIG. 1 shows that AP 122 may receive a data packet 146 coming from STA 144. In particular embodiments, AP 122 may determine, whether to transmit the high-priority frame 128 over the transmission of the data packet 146, based on different evaluations using quality-of-service based on mechanisms.

Figure 2A:
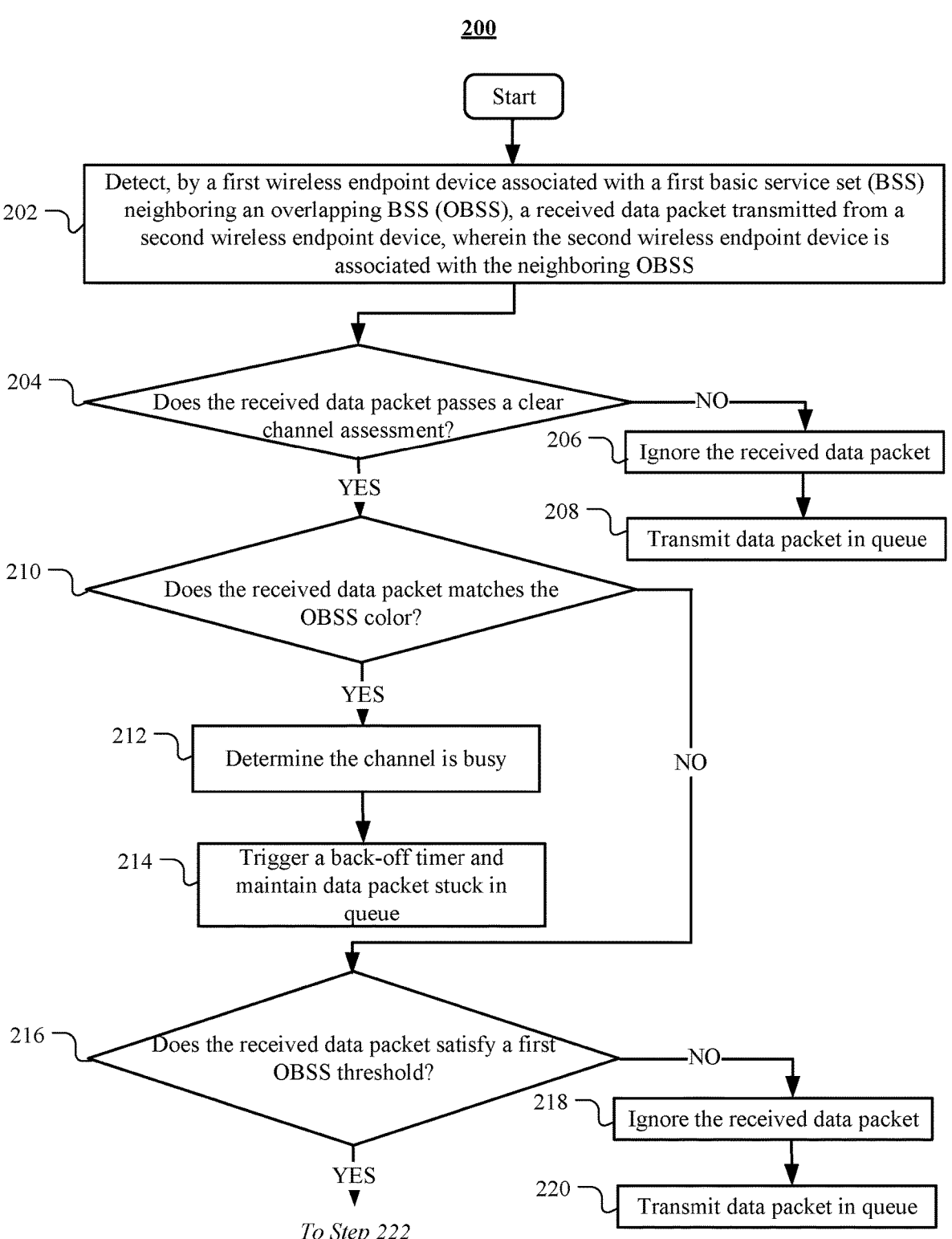
FIGS. 2A-2B illustrate an example flow diagram of a method for prioritizing transmissions of high-priority packets, in accordance with certain embodiments.
Figure 2B:
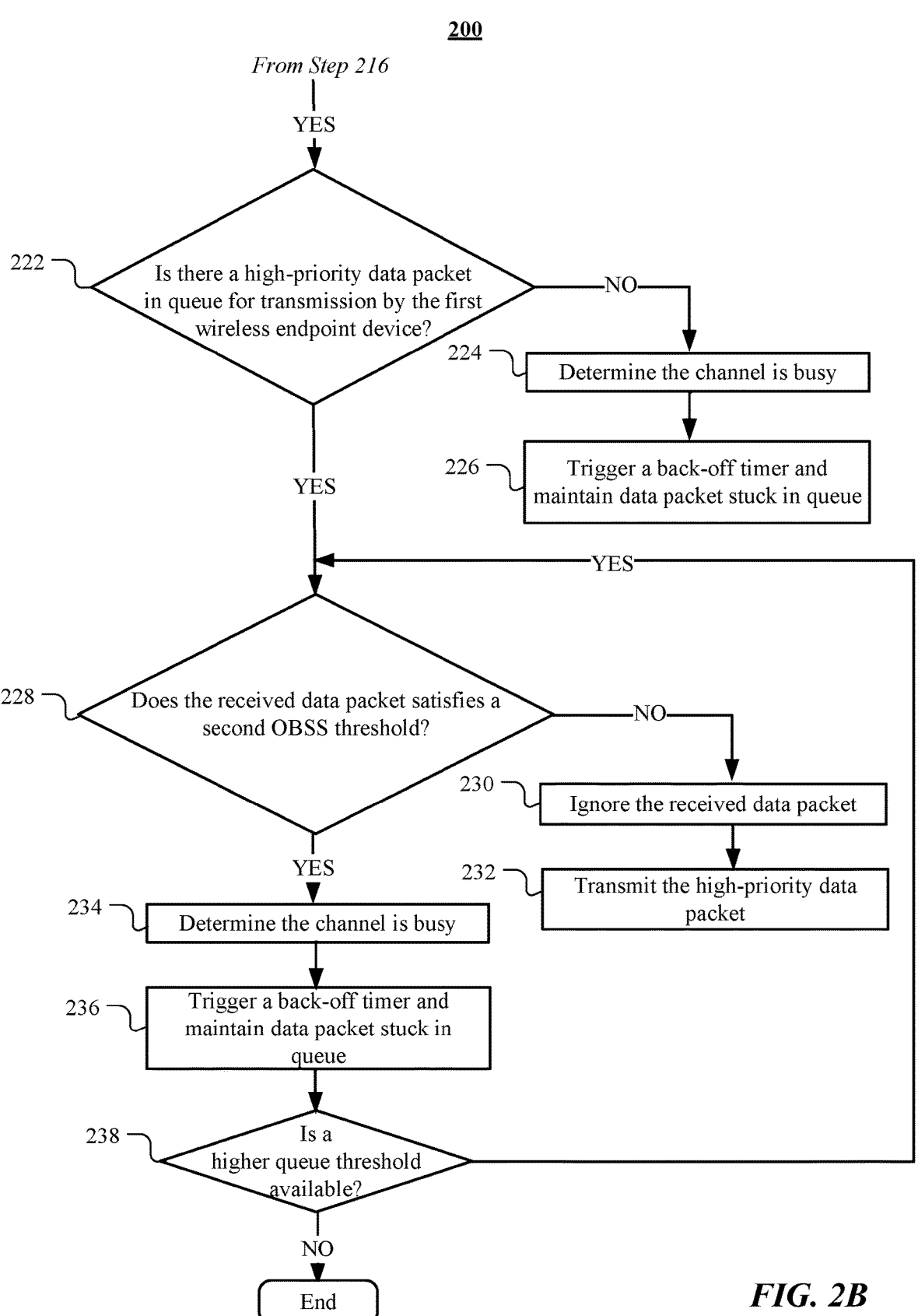

FIGS. 2A-2B illustrate an example flow diagram of a method 200 for prioritizing transmissions of high-priority packets, in accordance with certain embodiments. In an embodiment, the steps of method 200 may be performed by a first wireless endpoint device. As an example and not by way of limitation, the first wireless endpoint device may be an access point. As another example and not by way of limitation, the first wireless endpoint device may be a station. The method 200 may start and proceed to step 202. At step 202, the first wireless endpoint device may detect, by the first wireless endpoint device associated with a first basic service set (BSS) neighboring an overlapping BSS (OBSS), a received data packet transmitted from a second wireless endpoint device, wherein the second wireless endpoint device is associated with the OBSS.

At step 204, the first wireless endpoint device may determine whether the received data packet passes a clear channel assessment (CCA). If the received data packet does not pass the clear channel assessment, the method may proceed to step 206, where the first wireless endpoint device may ignore the received data packet. Further to step 208, the first wireless endpoint device may transmit the data packet in queue, e.g., based on transmit opportunity (TXOP). TXOP is a MAC layer feature used in IEEE 802.11-based wireless local area networks (WLANs). TXOP defines the time duration for which a station can send frames after it has gained contention for the transmission medium.

If the received data packet passes the clear channel assessment, the method may proceed to step 210, where the first wireless endpoint device may determine whether the received data packet matches the OBSS color. If the received data packet matches the OBSS color, the first wireless endpoint device may determine the channel is busy at step 212. At step 214, the first wireless endpoint device may trigger a back-off timer and maintain data packet stuck in queue.

If the received data packet does not match the OBSS color, the first wireless endpoint device may determine whether the received data packet satisfies a first OBSS threshold at step 216. If the received data packet does not satisfy the first OBSS threshold, the first wireless endpoint device may ignore the received data packet at step 218. Further to step 220, the first wireless endpoint may transmit data packet in queue, e.g., based on transmit opportunity. In exemplary embodiments, the value of the OBSS threshold may be set as follows. If the wireless endpoint device does not support BSS coloring and if the BSSID (receiver address) of the interfering packet (i.e., the received data packet) is not a match to the transmitting BSSID, then the OBBS threshold may be set as the weighted start-of-packet (SOP) threshold. If the BSS coloring does not match the BSSID, then the weighted OBSS threshold may be applied.

If the received data packet satisfies the first OBSS threshold, the first wireless endpoint device may determine whether there is a high-priority data packet in queue for transmission by the first wireless endpoint device at step 222. If there is no high-priority data packet in queue for transmission, the first wireless endpoint device may determine the channel is busy at step 224. At step 226, the first wireless endpoint device may trigger a back-off timer and maintain data packet stuck in queue.

If there is a high-priority data packet in queue for transmission by the first wireless endpoint device as determined at step 222, the first wireless endpoint device may determine whether the received data packet satisfies a second OBSS threshold at step 228. If the received data packet does not satisfy the second OBSS threshold, the first wireless endpoint device may ignore the received data packet at step 230. Further to step 232, the first wireless endpoint may transmit the high-priority data packet, e.g., based on transmit opportunity.

If the received data packet satisfies the second OBSS threshold, the first wireless endpoint device may determine the channel is busy at step 234. At step 236, the first wireless endpoint device may trigger a back-off timer and maintain the high-priority data packet stuck in queue. At step 238, the first wireless endpoint device may determine whether there is a higher queue threshold available. If there is a higher queue threshold available, the method 200 may return to step 228. If there is no higher queue threshold available, the method 200 may end.

It is to be understood that although two OBSS thresholds are described in the method 200, this disclosure contemplates any suitable number of OBSS thresholds. As an example and not by way of limitation, a user priority marking may have the value from 0 through 7. Correspondingly, the wireless endpoint device may set a respective OBSS threshold for each of these user priority markings.

In particular embodiments, there may be a direct correlation between the marking (e.g., QOS/UP) of the high-priority data packet in the queue to be transmitted and the threshold setting. As an example and not by way of limitation, if the high-priority data packet to be transmitted has AC_VI (access category: video) marking, the chosen OBSS threshold may be −65 dBm. But if the high-priority data packet to be transmitted had a marking of AC_BE (access category: best effort), the OBSS threshold may be set as −80 dBm. In particular embodiments, the first wireless endpoint device may increase the OBSS threshold even further based on the time of the high-priority data packet being in queue. As a result, while a data packet with AC_VI marking starts at threshold of −65 dBm, for every 10 ms this data packet is in queue, the OBSS threshold may be increased by 3 dB. The data packet with AC_VI marking in the queue waiting to be transmitted may have the OBSS threshold go up as high as −59 dBm if it is not transmitted in 20 ms. In particular embodiments, this same variability with different slope (dB/ms) may be adopted at all categories of marking associated with the data packets in queue.

In particular embodiments, the first wireless endpoint device may utilize weighted random escalation for setting the OBSS threshold. Instead of a packet being given a specific value of the OBSS threshold, a random value between weight ranges for each category of marking may be selected. As an example and not by way of limitation, this may allow some of the data packets with AC_BE markings to use a slightly higher set OBSS threshold at times to improve the distribution between categories. For example, a data packet with AC_BE marking may be randomly assigned an OBSS threshold between −80 dBm and −75 dBm whereas a data packet with AC_VI marking may be assigned a random value between −70 dBm and −65 dBm. This may allow devices that have only BE traffic to compete more fairly with those having higher value data.

It is to be understood that one or more steps of method 200 may be executed by a wireless endpoint device. In other embodiments, the method may be executed by one or more components of a system, such as systems 100 described in FIG. 1. In still other embodiments, the method 200 of FIGS. 2A-2B may be construed in view of the described systems and processes of FIG. 1.

It is to be understood that the order in which the method 200 is described is not intended to be construed as a limitation, and any number of the described method steps may be combined, modified, or carried out in any order to implement the method 200 or alternative methods. Additionally, individual steps may be deleted from the method 200 without departing from the spirit and scope of the subject matter described herein. Furthermore, the method 200 can be implemented in any suitable hardware, software, firmware, or combination thereof.

Figure 3:
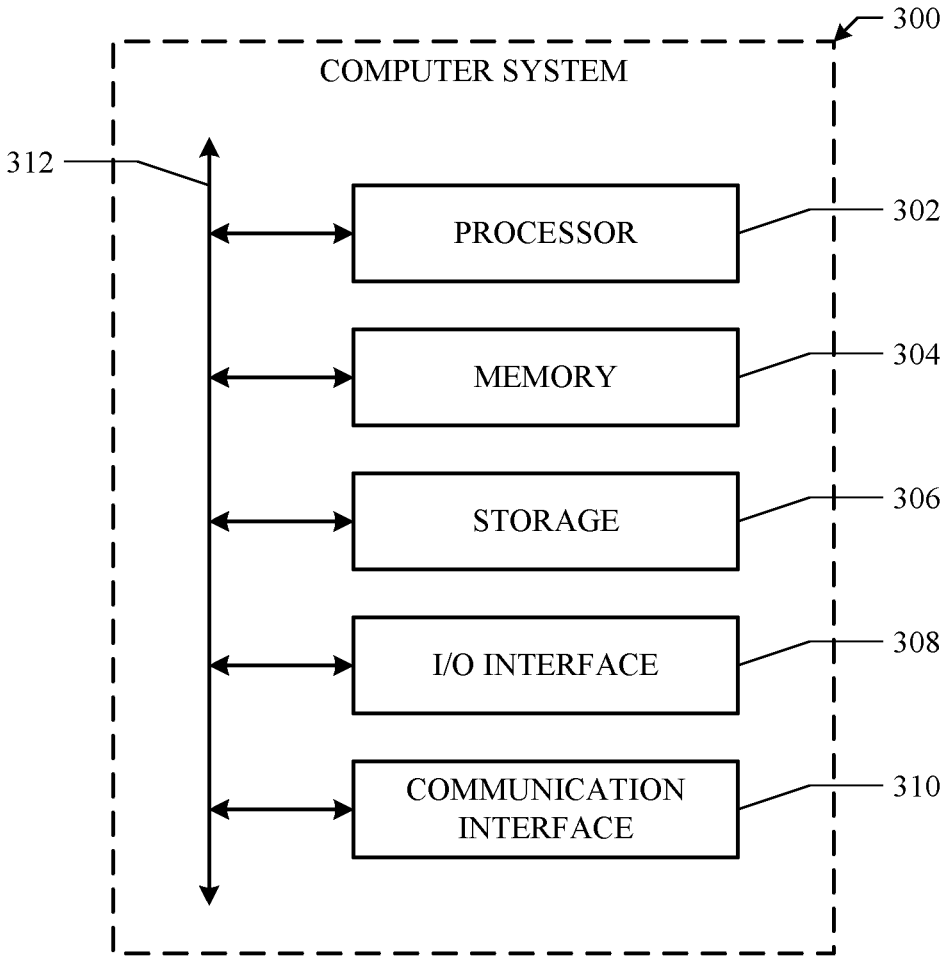
FIG. 3 illustrates an example computer system, in accordance with certain embodiments.

FIG. 3 illustrates an example computer system 300, in accordance with certain embodiments. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors; and
one or more computer-readable non-transitory storage media comprising instructions that, when executed by the one or more processors, cause one or more processors of the system to perform operations comprising:
detecting, by a first wireless endpoint device associated with a first basic service set (BSS) neighboring a neighboring overlapping BSS (OBSS), a received data packet transmitted from a second wireless endpoint device, wherein the second wireless endpoint device is associated with the neighboring OBSS;
determining, by the first wireless endpoint device, whether the received data packet satisfies a first OBSS threshold;
upon determining the received data packet satisfies the first OBSS threshold, determining, by the first wireless endpoint device, whether a high-priority data packet is in queue for transmission by the first wireless endpoint device;
upon determining a high-priority data packet is in queue for transmission, determining, by the first wireless endpoint device, whether the received data packet satisfies a second OBSS threshold determined based on a quality-of-service (QoS) level associated with the high-priority data packet; and
based on determining whether the received data packet satisfies the second OBSS threshold:
if the received data packet satisfies the second OBSS threshold, maintaining, by the first wireless endpoint device, the high-priority data packet in queue for transmission; and
if the received data packet does not satisfy the second OBSS threshold, transmitting, by the first wireless endpoint device, the high-priority data packet.

2. The system of claim 1, wherein the operations further comprise:
upon determining the received data packet does not satisfy the first OBSS threshold, transmitting, by the first wireless endpoint device, one or more data packets in queue for transmission.

3. The system of claim 1, wherein the operations further comprise:
upon determining a high-priority data packet is not in queue for transmission, triggering, by the first wireless endpoint device, a back-off timer; and
maintaining, by the first wireless endpoint device, one or more data packets in queue for transmission.

4. The system of claim 1, wherein a priority associated with the high-priority data packet indicates the QoS level.

5. The system of claim 1, wherein the operations further comprise:
determining, based on the QoS level associated with the high-priority data packet by the first wireless endpoint device, the second OBSS threshold from among a plurality of OBSS thresholds.

6. The system of claim 1, wherein the operations further comprise:
determining, based on a category of marking associated with the high-priority data packet by the first wireless endpoint device, a priority associated with the high-priority data packet.

7. The system of claim 1, wherein the operations further comprise:
determining, based on a category of marking associated with the high-priority data packet by the first wireless endpoint device, the second OBSS threshold.

8. The system of claim 1, wherein the operations further comprise:
determining, by the first wireless endpoint device, a waiting time of the high-priority data packet being in queue for transmission;
updating, based on the waiting time by the first wireless endpoint device, the second OBSS threshold;

determining, by the first wireless endpoint device, the received data packet does not satisfy the updated second OBSS threshold; and transmitting, by the first wireless endpoint device, the high-priority data packet.

9. A method, comprising:

detecting, by a first wireless endpoint device associated with a first basic service set (BSS) neighboring a neighboring overlapping BSS (OBSS), a received data packet transmitted from a second wireless endpoint device, wherein the second wireless endpoint device is associated with the neighboring OBSS;

determining, by the first wireless endpoint device, whether the received data packet satisfies a first OBSS threshold;

upon determining the received data packet satisfies the first OBSS threshold, determining, by the first wireless endpoint device, whether a high-priority data packet is in queue for transmission by the first wireless endpoint device;

upon determining a high-priority data packet is in queue for transmission, determining, by the first wireless endpoint device, whether the received data packet satisfies a second OBSS threshold determined based on a quality-of-service (QoS) level associated with the high-priority data packet; and based on determining whether the received data packet satisfies the second OBSS threshold:

if the received data packet satisfies the second OBSS threshold, maintaining, by the first wireless endpoint device, the high-priority data packet in queue for transmission; and if the received data packet does not satisfy the second OBSS threshold, transmitting, by the first wireless endpoint device, the high-priority data packet.

10. The method of claim 9, further comprising:

upon determining the received data packet does not satisfy the first OBSS threshold, transmitting, by the first wireless endpoint device, one or more data packets in queue for transmission.

11. The method of claim 9, further comprising:

upon determining a high-priority data packet is not in queue for transmission, triggering, by the first wireless endpoint device, a back-off timer; and maintaining, by the first wireless endpoint device, one or more data packets in queue for transmission.

12. The method of claim 9, further comprising:

determining, based on the QoS level associated with the high-priority data packet by the first wireless endpoint device, the second OBSS threshold from among a plurality of OBSS thresholds.

13. The method of claim 9, further comprising:

determining, based on a category of marking associated with the high-priority data packet by the first wireless endpoint device, a priority associated with the high-priority data packet.

14. The method of claim 9, further comprising:

determining, based on a category of marking associated with the high-priority data packet by the first wireless endpoint device, the second OBSS threshold.

15. The method of claim 9, further comprising:

determining, by the first wireless endpoint device, a waiting time of the high-priority data packet being in queue for transmission;

updating, based on the waiting time by the first wireless endpoint device, the second OBSS threshold;

determining, by the first wireless endpoint device, the received data packet does not satisfy the updated second OBSS threshold; and transmitting, by the first wireless endpoint device, the high-priority data packet.

16. A non-transitory computer-readable medium comprising instructions that are configured, when executed by a processor, to:

detect, by a first wireless endpoint device associated with a first basic service set (BSS) neighboring a neighboring overlapping BSS (OBSS), a received data packet transmitted from a second wireless endpoint device, wherein the second wireless endpoint device is associated with the neighboring OBSS;

determine, by the first wireless endpoint device, whether the received data packet satisfies a first OBSS threshold;

upon determining the received data packet satisfies the first OBSS threshold, determine, by the first wireless endpoint device, whether a high-priority data packet is in queue for transmission by the first wireless endpoint device;

upon determining a high-priority data packet is in queue for transmission, determining, by the first wireless endpoint device, whether the received data packet satisfies a second OBSS threshold determined based on a quality-of-service (QoS) level associated with the high-priority data packet; and based on determining whether the received data packet satisfies the second OBSS threshold:

if the received data packet satisfies the second OBSS threshold, maintain, by the first wireless endpoint device, the high-priority data packet in queue for transmission; and if the received data packet does not satisfy the second OBSS threshold, transmit, by the first wireless endpoint device, the high-priority data packet.

17. The non-transitory computer-readable medium of claim 16, further comprising instructions that are configured, when executed by a processor, to:

upon determining the received data packet does not satisfy the first OBSS threshold, transmitting, by the first wireless endpoint device, one or more data packets in queue for transmission.

18. The non-transitory computer-readable medium of claim 16, further comprising instructions that are configured, when executed by a processor, to:

upon determining a high-priority data packet is not in queue for transmission, triggering, by the first wireless endpoint device, a back-off timer; and maintaining, by the first wireless endpoint device, one or more data packets in queue for transmission.

19. The non-transitory computer-readable medium of claim 16, further comprising instructions that are configured, when executed by a processor, to:

determine, based on the QoS level associated with the high-priority data packet by the first wireless endpoint device, the second OBSS threshold from among a plurality of OBSS thresholds.

* * * * *